Oct. 24, 1950     C. L. COOK ET AL     2,527,355
TRACTOR MOUNTED SPRING TOOTH HARROW
Filed March 28, 1947     2 Sheets-Sheet 1
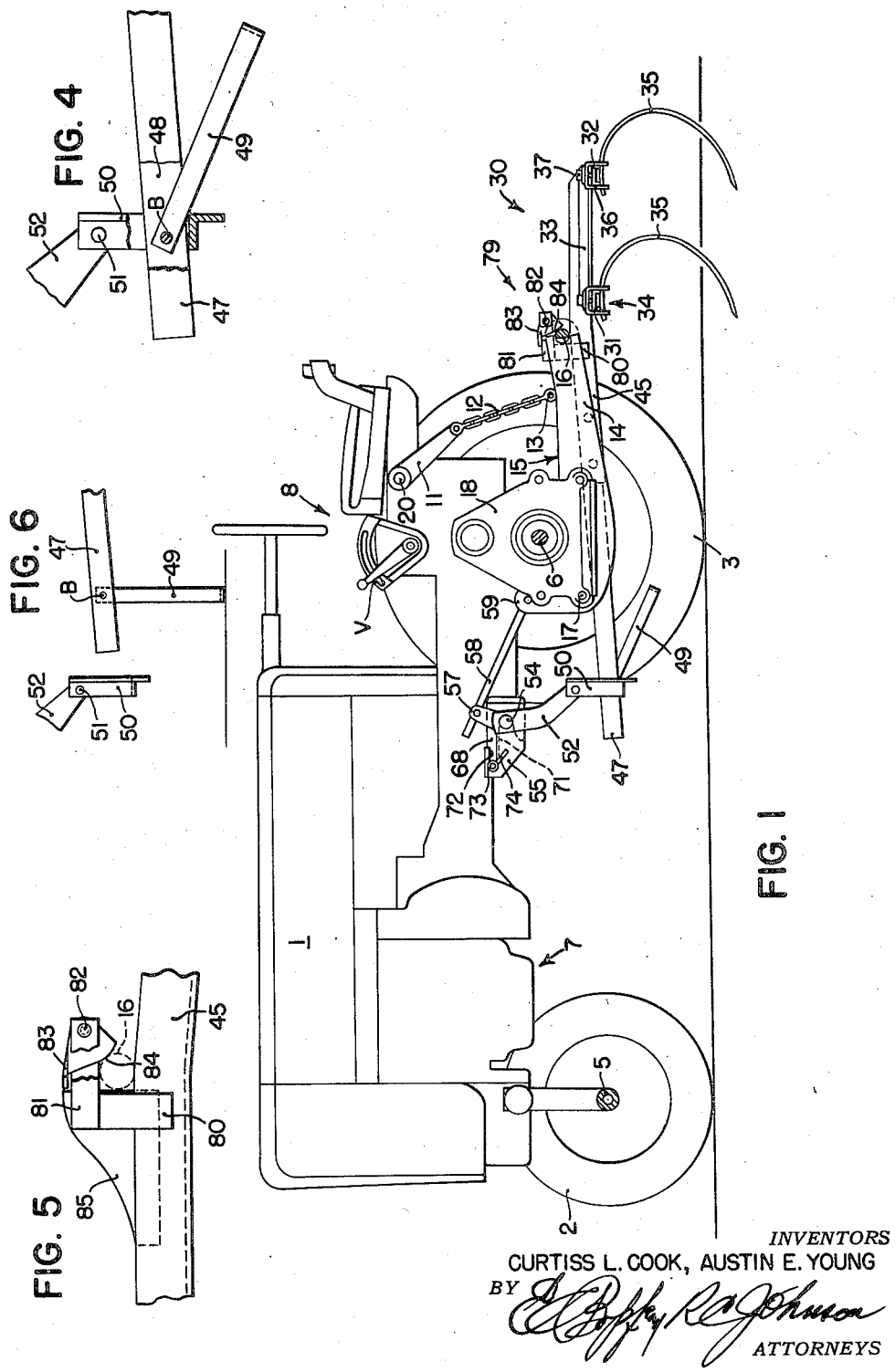
INVENTORS
CURTISS L. COOK, AUSTIN E. YOUNG
BY
ATTORNEYS

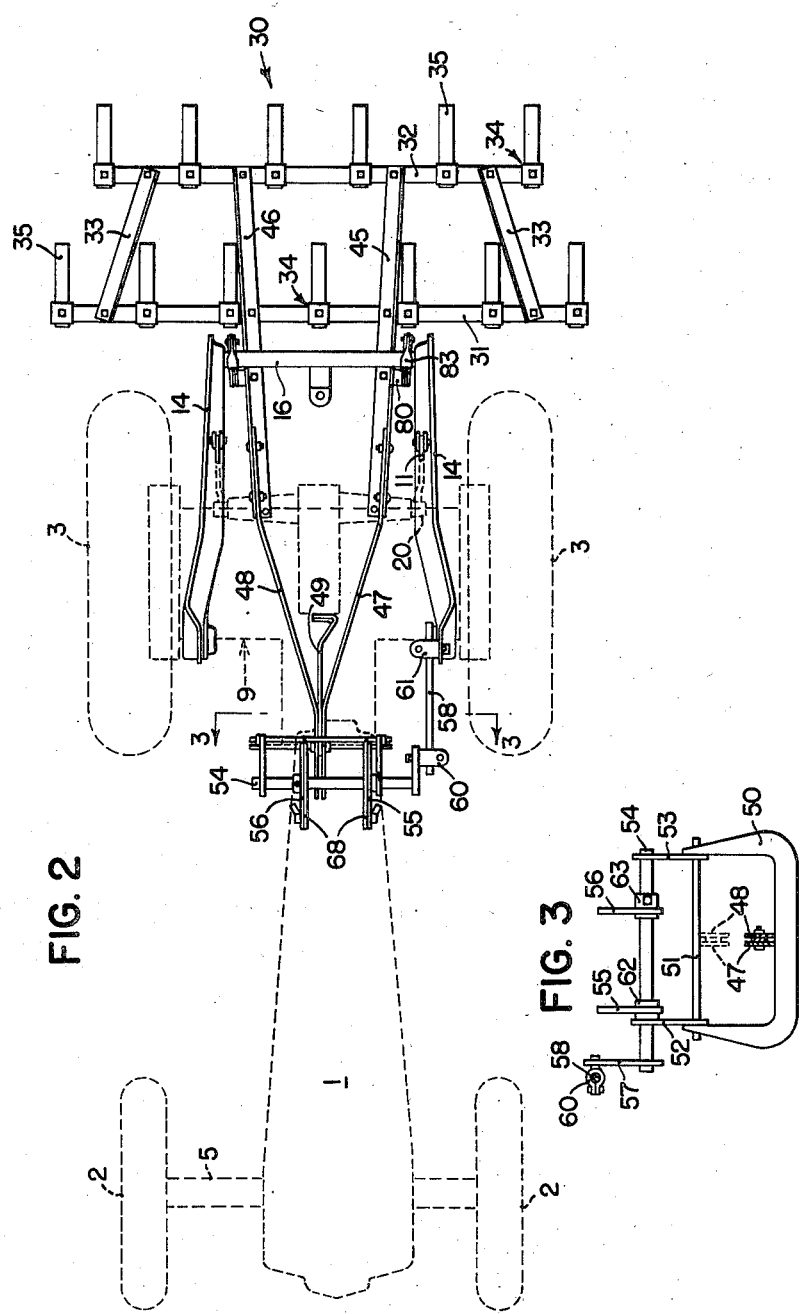

Patented Oct. 24, 1950

2,527,355

UNITED STATES PATENT OFFICE 2,527,355

TRACTOR MOUNTED SPRING TOOTH HARROW

Curtiss L. Cook and Austin E. Young, Syracuse, N. Y., assignors to Syracuse Chilled Plow Co., Inc., Syracuse, N. Y., a corporation of New York Application March 28, 1947, Serial No. 737,776

10 Claims. (Cl. 97—47)

The present invention relates generally to agricultural machines and more particularly to integral or tractor mounted implements.

The object and general nature of the invention is the provision of a new and improved integral implement which may be quickly and easily attached to or detached from its supporting tractor and in which the implement may readily be attached to the tractor by backing the tractor into the implement with the drawbar raised, then lowering the drawbar slightly, and then driving forwardly.

It is a more particular object of this invention to provide new and improved means for attaching the rear end of the implement to the drawbar of the tractor so as to allow for quick and easy attachment and detachment of the implement from the tractor, and which when attached, connects the implement to the drawbar so as to prevent any displacement of the implement.

These and other objects and advantages of the present invention will be readily apparent to those skilled in the art after a consideration of the following detailed description, taken in conjunction with the accompanying drawings in which the preferred form of the present invention has been illustrated.

In the drawings:

Figure 1 is a side elevational view of a quick attachable implement, such as a spring tooth harrow, showing it mounted in position on its propelling and supporting tractor, one wheel of the tractor being removed for clarity.

Figure 2 is a plan view of the implement shown in Figure 1, the tractor being indicated in dotted lines so as to show the implement parts as clearly as possible.

Figure 3 is a sectional view taken generally along the line 3—3 of Figure 2.

Figure 4 is a detail section through the forward tractor bail.

Figure 5 is a view of a modification of the cam retaining structure.

Figure 6 is a fragmentary view showing the front end supported on the stand ready to be attached to the tractor.

Referring now to the drawings, particularly Figures 1 and 2, the reference numeral 1 indicates a farm tractor of the four wheel type, having front and rear wheels 2 and 3 journaled for rotation on axle means 5 and 6. The tractor includes power means 7 and a power lift unit 8 of the hydraulic type, including suitable valve mechanism V and other necessary parts, such as a pair of lift arms 11 and chains 12 connecting the arms 11 to a pair of lugs 13 formed on the side members 14 of a generally vertically swingable tractor drawbar or bail member 15. The latter is preferably in the form of a U-shaped member and includes a rear transverse section or bar 16 which may be formed of round stock. The sides 14 may be of welded pressed metal construction and are pivoted at their front ends, as at 17, to drop housings 18 which form a part of the tractor rear axle structure 9. Preferably the rear part 16 is welded or otherwise permanently secured to the side parts 14 of the tractor drawbar or bail 15. The two power lift arms 11 are clamped or otherwise fixed in any suitable manner to the ends of a power lift rockshaft 20 which forms a part of the hydraulic unit 8.

As best shown in Figures 1 and 2, one of the implements that may easily and quickly be attached to and detached from the tractor is a spring tooth harrow, indicated in its entirety by the reference numeral 30. The implement 30 includes two tooth bars 31 and 32 which are generally U-shaped and are inverted so that their flanges extend downwardly. The tooth bars 31, 32 extend transversely and are connected together near their extremities by tooth bar braces 33, which may be in the form of angle irons. The tooth bars 31, 32 have securely fastened to them by clamping means 34 a plurality of spring teeth 35. As best shown in Figure 1, the clamping means 34 includes a U-shaped tooth holder 36 which is apertured and threaded at its base to receive a set screw 37 and which is apertured near the outer ends of its flanges to receive a spring tooth 35. The set screw 37 bears against the tooth bar 31 or 32, and upon tightening the set screw 37, the flanges of the tooth bar 31 or 32 firmly abut against the tooth 35 and hold it securely in position.

A pair of laterally spaced generally longitudinally extending beams 45, 46 are rigidly fixed in any suitable manner at their rear ends to the tooth bars 31, 32, and are preferably of angle iron construction. The beams 45, 46 bend downwardly intermediate their ends and converge slightly at their forward ends. Beams 45 and 46 have connected at their forward ends in any suitable manner, strap members 47 and 48 which extend forwardly and convergently to form a V. At their forward ends they are connected together and spaced apart to receive between them a swingable implement stand 49 which is apertured at its upper end to receive a pivot bolt B (Figure 4) passing through the registered openings in straps 47 and 48. The implement stand 49 is fashioned at its lower end so as to present a substantially horizontal surface when the stand 49 is hanging vertically. The members 47, 48 extend forwardly underneath the rear axle 6 of the tractor and at their forward ends rest in a vertically shiftable bail member 50, the upper ends of which, as best shown in Figure 3, are apertured to receive a cross bar 51 that is carried in the rear lower ends of a pair of arms 52 and 53 which at their upper or forward portions are welded or otherwise suitably fixed to a cross shaft 54. The latter is supported in suitable bearing brackets 55 and 56 and at one end has an arm 57 fixed thereto and connected by a link 58 to an arm 59 formed on the left side member 14 of the tractor drawbar bail 15. Connection between the front end of the link 58 and the arm 57 is effected by means of a clamping swivel 60, and a similar clamping swivel 61 serves to connect the rear end of the link 58 with the upper end of arm 59. The cross shaft 54 is held in the desired lateral position with respect to the bearing brackets 55 and 56 by a sleeve 62 abutting against the upper portion of arm 52 and by a clamp collar 63 associated with bracket 56.

The two bearing plates 55 and 56 are adapted to be readily and quickly attachable to and detachable from the tractor 1, preferably the intermediate portion thereof forward of the rear axle 6. To accomplish this, the tractor carries a pair of attaching plates 68 bolted to the tractor. Each of the attaching plates 68 is provided with a forwardly facing notch 71 (shown in dotted lines in Figure 1) which is adapted to receive the cross shaft 54, the upper and lower edges of the notch 71 flaring downwardly and forwardly to facilitate movement of the shaft 54 and associated parts into position. Also, bearing bracket 55 is provided with a rearwardly facing notch 72 which is adapted to receive a stud 73 carried by each attaching plate 68, and bracket 56 is provided with an aperture (not shown) to receive the stud 73, the notched bearing bracket 55 facilitating each attachment or detachment after the stud 73 has engaged or disengaged the aperture in bearing bracket 56. The studs 73 are threaded and wing nuts 74 are provided to secure the brackets 55 and 56 to the attaching plates 68.

The implement frame members 45 and 46 carry cam latches 79 especially adapted to engage the section 16 of the tractor drawbar 15. The cam latches 79 are identical, except that one is a left hand and the other a right hand unit, and it will therefore be sufficient to describe one of them, such as the cam latch associated with beam 45. A generally S-shaped bracket 80, the ends of which are substantially vertical, is attached, as by welding, to the beam 45. The upper end of the bracket is disposed in a vertical plane displaced laterally outwardly of the vertical plane containing the lower end of the bracket, and is disposed between the forward ends of two longitudinally extending horizontal members 81 and is fixed to them, as by welding, so as to present flush surfaces at the forward end of the connection and at the top. The members 81 are displaced vertically upwardly from the beam 45 a distance slightly greater than the diameter of the rear transverse section 16 of the tractor drawbar bail 15, and are apertured near their rear ends to receive a pivot bolt 82 upon which is swingably mounted a cam member 83.

As best shown in Figure 1, the cam member 83 has a flattened top section which may rest upon the upper surfaces of members 81, and when the cam is in this position it has a lower curved section 84, the forward edge of which is generally arcuate about a center defined by the pivot bolt 82, and which projects vertically from the flattened top surface beneath and between the lower portions of the members 81, whereby the curved forward edge of the section 84 abuts against the rear transverse section 16 of the tractor drawbar 15. The section 84 thus serves to hold the rear transverse section 16 securely in position adjacent members 81, bracket 80, and beam 45 irrespective of the various positions in which the drawbar 15 may be disposed by the actuation of the power lift unit 8.

Referring now to Figure 5, the reference numeral 85 denotes one of a pair of identical gussets, the lowermost parts of which are attached, as by welding, to the laterally inward sides of beams 45 and 46. The forward surfaces of the gussets 85 are formed in generally S-shaped curves, and the lower foremost parts of the surfaces blend smoothly into the top flanges of the beams 45 and 46, as shown. The uppermost surfaces of the gussets are disposed slightly above the members 81 and are contained in the same horizontal plane as the tops of the cams 83.

The operation of the preferred form of the present invention is substantially as follows.

As the implement 30 rests upon the ground, it is supported on the front rows of spring teeth 35 and the implement stand 49. As best shown in Figure 6, the latter is of such length that the beams 45 and 46 are held in an elevated position convenient to automatic and unaided engagement with the bail member 50 as the tractor is backed into position.

As the tractor 1 is backed into position, the drawbar 15 is held slightly above its lowered position until the tractor has backed to a point where the rear transverse section 16 of the drawbar 15 is disposed to the rear of the cam latch mechanism 79. Slightly before the tractor reaches this position, the swingable bail 50 comes into contact with the implement stand 49 and forces it to swing rearwardly and upwardly generally into the position shown in Figure 4, the bail 50 holding the stand 49 well out of engagement with the ground. At this position the drawbar 15 is lowered until the rear transverse section 16 engages the beams 45 and 46. As the tractor is driven forward slowly the transverse section 16 will engage the under side of the cam 83 and will force the cam upwardly until the curved surface 84 comes in contact with the section 16, at which point the cam 83 will lower into latching position and will hold the drawbar securely in place.

With the modification shown in Figure 5, as the tractor 1 is backed into position, the drawbar 15 may remain in a lowered position, and upon contact with the gussets 85 the drawbar will be raised by the sloping surfaces of the gussets and will slide across the tops of the cams until the tractor has reached a position where the drawbar will drop onto the beams 45 and 46. Then the tractor may be driven slowly forwardly into engagement as above described.

Because of the linkage including bail 50, shaft 54, arm 57, link 58, and arm 59, both the front and rear ends of the implement 30 will be raised and lowered into different parallel positions with respect to the tractor as the power lift unit 8 is actuated. It is to be noted that as the teeth 35 are located behind the bar 16, the implement tends to pivot about bar 16, forcing the beams 45 and 46 securely against the bail 50 because of the rearward soil pressure against the teeth 35. This insures a rigidly connected implement during operation.

When it is desired to lift the implement into a transport position the valve V is operated to cause the power lift arms 11 to be swung upwardly. As the greater weight of the implement lies rearwardly of the bar 16, the first effect of the lifting action is to raise the front ends of the straps 47 and 48 upwardly until they contact the upper pivot bar 51 (see dotted line position of straps 47 and 48 in Figure 3). After this contact is made, further upward movement of the arms 11 serves to raise the entire implement. The upward movement of the front ends of the beams 45 and 46 has the advantage that the teeth 35 are tilted upwardly which aids their running out of the ground.

When it is desired to detach the implement the valve V is actuated to move the power lift arms 11 to a position where the spring teeth 35 are resting on the surface of the ground. The operator then turns the cams 83 in a clockwise direction, as viewed in Fig. 1, to a position in which the flattened top surfaces of the cams point downwardly and rearwardly, and then backs the tractor far enough so that the bar 16 is disposed rearwardly of the members 81 and the cams 83. Then, after raising the drawbar slightly, the tractor may be driven forwardly. As the tractor does so, the bail 50 moves out of engagement with the implement stand 49 and the latter swings downwardly and forwardly into ground engaging position and supports the front end of the completely disengaged implement.

The present invention is not necessarily limited to a spring tooth harrow or the like.

While we have shown and described above the preferred structure in which the principles of the present invention have been incorporated, it is to be understood that our invention is not to be limited to the particular details shown and described above, but that, in fact, widely different means within the scope of the invention may be employed in the practice of the broader aspects of our invention.

What we claim, therefore, and desire to secure by Letters Patent is:

1. A tractor mounted implement adapted to be mounted on a tractor having a generally vertically swingable drawbar and means on the tractor for swinging said drawbar, said implement comprising a frame, ground working tools carried on said frame, a pair of L-shaped members on said frame, each having a leg spaced vertically from said frame and extending generally rearwardly, and swingable locking means carried by said legs, said drawbar adapted to be engaged in between said legs and said frame and releasably locked therebetween by first backing said tractor, then lowering said drawbar adjacent and beneath said vertically spaced legs, and then driving the tractor forwardly to bring said drawbar into locked position between said legs and said frame.

2. An implement adapted to be attached to a tractor having a drawbar, said implement comprising a frame, a pair of drawbar retaining members on said frame, a rotatable cam pivoted to each of said members, and a stop on said cam limiting its downward movement in a forward direction and engageable with said drawbar retaining members for releasably locking said drawbar in a seated position between said drawbar retaining members and said frame.

3. An implement adapted to be mounted on a tractor having two fore and aft spaced implement-engaging bails, both swingable on the tractor generally vertically, and means for swinging said bails, said implement comprising a frame, forwardly extending beams rigid with said frame extending generally forwardly underneath said tractor, one of said bails being engageable with the front portions of said beams as said tractor is driven rearwardly into attachment position, and swingable attaching means on said frame for detachably connecting said frame with the other of said bails as said tractor is driven forwardly, whereby said implement may be readily mounted on said tractor with no manual assistance required for supporting, guiding, or connecting said implement.

4. An implement adapted to be connected with a tractor having generally vertically shiftable implement engaging means at the rear of the tractor, said implement comprising a frame adapted to pass underneath said implement engaging means when the latter is raised, rearwardly facing attaching means on said frame adapted to receive said engaging means after the latter in its raised position has been passed over said attaching means and then lowered and the tractor then driven forwardly, and means on said frame for releasably connecting said implement engaging means in said rearwardly facing attaching means.

5. An implement adapted to be mounted on a tractor having two fore and aft spaced generally vertically shiftable bails, said implement comprising a frame, a forwardly extending beam rigid with said frame adapted to extend generally forwardly underneath said tractor, a swingable implement stand pivotally connected with the forward portion of said beam, said stand being connected to the beam in such position that one of said bails is engageable with the front portion of said beam and swings said implement stand rearwardly out of ground engaging position as said tractor is driven rearwardly over said beam into attachment position, swingably attachable means on said frame for detachably connecting said frame with the other of said bails as said tractor is driven forwardly, whereby said implement may be mounted on said tractor with no manual assistance required during the attachment operation.

6. An implement adapted to be connected to a tractor having a drawbar, said implement comprising a forwardly extending frame, ground working tools thereon, a vertically swingable implement stand pivotally connected to the forward portion of said frame whereby said implement is supported by said tools and said stand when in an inoperative position, and self-locking means on said frame for detachably connecting said frame to said drawbar when the tractor is driven into position to receive the implement, and means adapted to be attached to the tractor forward of the drawbar for connecting the forward end of the frame with the tractor, said means being spaced so as to swing said implement stand out of engagement with the ground when the tractor is moved relative to the implement into said position.

7. Implement-attaching means for attaching an implement frame to a tractor having a vertically swingable drawbar carried by said tractor and means on said tractor for swinging said drawbar, said implement-attaching means comprising a pair of lifting gussets on said frame, a pair of L-shaped members on said frame, each of the latter having a leg spaced vertically from said frame and extending generally rearwardly, and swingable locking means carried by said legs, said drawbar adapted to be moved along said frame, raised by said gussets, dropped behind said legs and engaged and releasably locked between said legs and said frame by first backing said tractor and then driving said tractor forwardly.

8. Implement-attaching means for attaching an implement frame to a tractor having a vertically swingable drawbar carried by said tractor and means on said tractor for swinging said drawbar, said implement-attaching means comprising a pair of L-shaped members on said frame, each of the latter having a leg spaced vertically from said frame and extending generally rearwardly, and swingable locking means carried by said legs, said drawbar adapted to be moved along said frame, dropped behind said legs and engaged and releasably locked between said legs and said frame by first backing said tractor and then driving said tractor forwardly.

9. The invention set forth in claim 5, further characterized by said implement stand being connected to the implement frame in such position that the forward tractor bail engages and holds said stand in raised position after the tractor has been driven forwardly relative to the implement a distance sufficient to cause said swingably attachable means to connect the implement to the rear tractor bail.

10. An implement adapted for attachment to a tractor having a rear axle structure and a drawbar bail member swingable by power generally vertically, said implement comprising generally forwardly extending frame means adapted to be disposed underneath the tractor when the latter is backed over the implement, a drawbar-receiving bracket having a rearwardly facing hook-like section on the upper side of the rear portion of said frame means, said hook-like section being so constructed and arranged that when the tractor is backed as aforesaid with the drawbar raised, the latter clears the bracket and the drawbar may be lowered in a position rearwardly of said bracket whereupon forward movement of said tractor brings said drawbar into engagement with said hook-like section.

CURTISS L. COOK.
AUSTIN E. YOUNG.

REFERENCES CITED

The following references are of record in the file of this patent:

UNITED STATES PATENTS

| Number | Name | Date |
|---|---|---|
| 64,839 | Chace | May 21, 1867 |
| 239,530 | Morsman | Mar. 29, 1881 |
| 262,465 | Packard | Aug. 8, 1882 |
| 1,250,013 | Reicks | Dec. 11, 1917 |
| 2,302,842 | Cook | Nov. 24, 1942 |
| 2,339,225 | Strandlund | Jan. 11, 1944 |

FOREIGN PATENTS

| Number | Country | Date |
|---|---|---|
| 189,998 | Great Britain | Dec. 14, 1922 |